No. 748,884. PATENTED JAN. 5, 1904.
H. C. REICHARDT.
FISH CATCHER.
APPLICATION FILED JUNE 16, 1903.
NO MODEL.
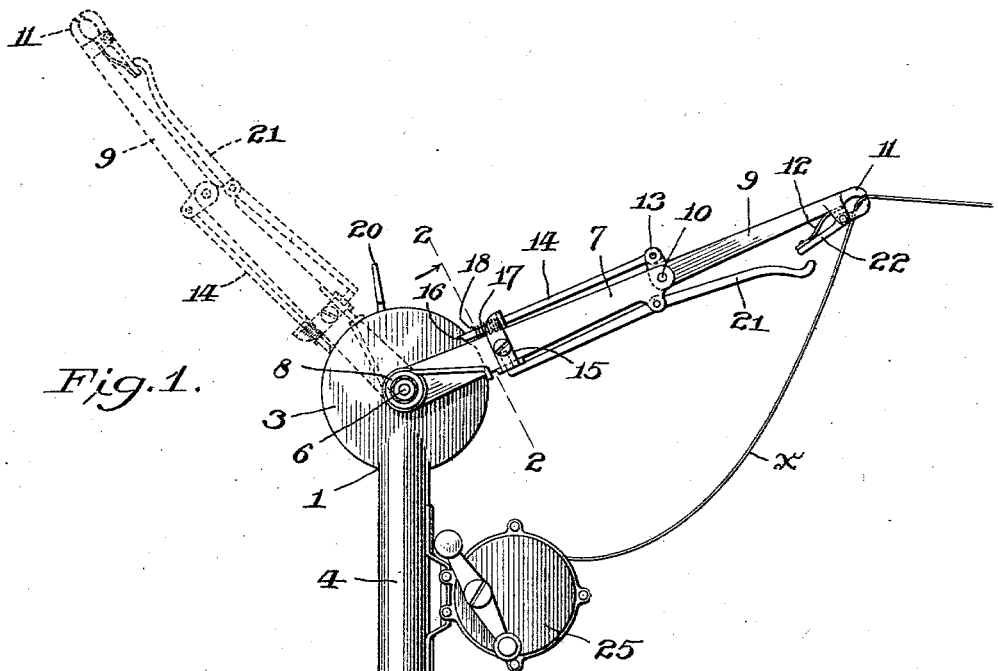
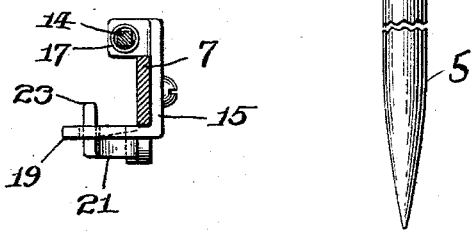
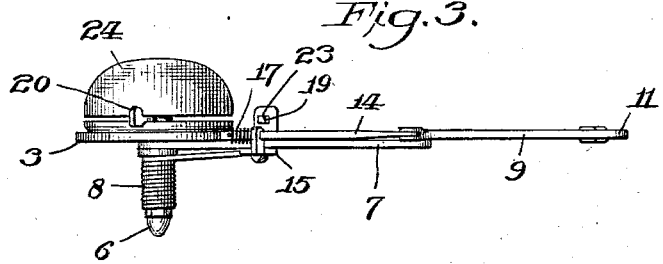
WITNESSES:
Walter C. Pusey.
H. H. Gamble.
INVENTOR.
Henry C. Reichardt
BY A. V. Groupe
ATTORNEY.

No. 748,884. Patented January 5, 1904.

UNITED STATES PATENT OFFICE.

HENRY C. REICHARDT, OF POTTSVILLE, PENNSYLVANIA.

FISH-CATCHER.

SPECIFICATION forming part of Letters Patent No. 748,884, dated January 5, 1904.

Application filed June 16, 1903. Serial No. 161,697. (No model.)

*To all whom it may concern:*

Be it known that I, HENRY C. REICHARDT, a citizen of the United States, residing at Pottsville, in the county of Schuylkill and State of Pennsylvania, have invented certain new and useful Improvements in Fish-Catchers, of which the following is a specification.

This invention relates to fish-catchers, its principal object being to provide a simple and efficient device for use in connection with a hook and line whereby when a fish nibbles at the bait upon the hook the device will automatically jerk the line, and thereby hook the fish.

With this and other objects in view the invention consists in the novel construction and combinations of parts, which will be hereinafter fully described and claimed.

In the drawings, Figure 1 is an elevation of my improved fish-catcher. Fig. 2 is a sectional detail thereof as on the line 2 2 of Fig. 1. Fig. 3 is a plan view of Fig. 1, omitting the reel.

1 designates a support comprising, preferably, the upper disk-like portion 3 and the tubular portion 4, the latter being fitted to the upper end of a pointed stake 5. Projecting from the disk-like portion 3 of the support is a centrally-arranged stud 6, on which is pivotally mounted one end of an arm 7, adapted to move back and forth adjacent to one face of said portion. The outwardly-projecting end of the stud 6 is provided with a torsion-spring 8, one end of which acts upon the arm 7, as shown. The outer end of the arm 7 is provided with an extension 9, pivoted to the arm, as at 10, and forming, in effect, a continuation of said arm. The outer end of the extension is provided with a pair of clamping-jaws 11, held normally together by the action of a spring 12. These jaws are adapted to engage the fishing-line $x$, as will hereinafter appear. The arm 7 is arranged to be held in the forward position against the action of the spring 8 by a suitable trip device, which in the present instance is as follows:

The extension 9 is provided with a projecting lug 13, to which is pivoted one end of an elongated pawl 14, the other end of which extends freely through an opening in a bracket 15 on the arm 7. The inner end of the pawl 14 is adapted to engage a notch 16 in the disk-like portion 3, and thereby hold the arm 7 in the forward position against the action of the spring 8. A suitable spring 17, encircling the pawl 14, bears against a pin 18 on the latter and the bracket 15, and thereby tends to force the pawl normally inward.

The bracket 15 is provided with a lateral projection 19, which is adapted to take against a suitable stop 20, and thereby limit the rearward movement of the arm 7 when said arm is released by the trip device.

In order to release the line $x$ from the jaws 11 after the arm 7 has been moved by the action of the spring 8, I provide the arm with a pivoted lever 21, one end of which is arranged adjacent to an arm 22, projecting from one of the jaws 11. The other end of the lever 21 is provided with a projection 23, which extends freely through an opening in the projection 19 of the bracket 15, to the end that just before the projection 19 engages the stop 20 the projection 23 will engage the latter, and thereby operate the lever 21 to open the jaws 11 against the action of the spring 12.

I preferably employ a sounding device to notify the attendant when the device has been operated, and for this purpose in the present instance I employ a well-known type of bell 24, similar to those used on bicycles. This bell 24 is mounted on the support 1, and the operating-arm for the bell serves as the stop 20 to limit the rearward movement of the arm 7, whereby when the projection 19 strikes the arm or stop 20 the bell will be sounded. I also preferably provide the support 1 with a suitable reel 25, upon which the line $x$ may be wound, one end of the line of course being secured to the reel.

The operation of the device may be briefly described as follows: The stake 5 is stuck into the bank near the water. The hook on the end of the line is provided with bait and cast into the water. The arm 7 is moved to the forward position against the action of the spring 8 and the pawl 14 engaged with the notch 16, and the line $x$ is engaged by the clamping-jaws 11, as shown in Fig. 1. When a fish nibbling at the bait pulls on the line $x$, the extension 9 is rocked on its pivot 10, which withdraws the pawl from engagement with the notch 16, and the arm 7 being thereby released is given a sudden backward movement or jerk by the action of the spring 8. This operation will, with few exceptions, catch the fish upon the hook. When the projection 23 of the lever 21 strikes the stop 20, the jaws 11 are opened, as previously explained, to release the line x, which gives the fish a free line, and thereby prevents any liability of the fish disengaging itself from the hook before being drawn in by the attendant.

While I have herein shown and described my invention in a desirable and practical form, yet I do not limit myself to this particular construction, as the same may be greatly modified without departing from the invention.

I claim—

1. In a fish-catcher, a support provided with a notch, an arm pivoted on said support, a spring acting upon said arm, a pawl to engage said notch to hold said arm against the action of said spring, means on said arm to engage a line, and connections between said means and pawl, whereby when the line is pulled the pawl is disengaged from the notch.

2. In a fish-catcher, a support provided with a notch, an arm pivoted on said support, a spring acting upon said arm, a pivoted extension carried by said arm, a pawl connected to said extension and adapted to engage said notch, and means carried by said extension to engage a line, whereby when the line is pulled the pawl is disengaged from the notch.

3. In a fish-catcher, a support provided with a notch, an arm pivoted on said support, a spring acting upon said arm, a pawl to engage said notch to hold said arm against the action of said spring, a pair of clamping-jaws on said arm to engage a line, and connections between said jaws and pawl, whereby when the line is pulled the pawl is disengaged from the notch.

4. In a fish-catcher, a support, a pivoted arm thereon to engage a line, means for giving said arm a sudden movement when the line is pulled, and a sounding device including an operating-arm arranged to be engaged by the first-named arm when said sudden movement takes place.

5. In a fish-catcher, a support provided with a notch, an arm pivoted to said support, a spring acting upon said arm, a pawl to engage said notch to hold said arm against the action of said spring, means on said arm to engage a line, connections between said means and pawl, whereby when the line is pulled the pawl is disengaged from the notch to release said arm, and a sounding device mounted on the support and including an operating-arm arranged to be engaged by the first-named arm when said first-named arm is released.

6. In a fish-catcher, a support, means thereon to engage a line, means including a trip device for giving the first-named means a sudden movement when the line is pulled, and means for disengaging the line from the first-named means after said sudden movement takes place.

7. In a fish-catcher, a support, a reel thereon to carry a line, means on said support to engage said line, means including a trip device for giving the first-named means a sudden movement when the line is pulled, and means for disengaging the line from the first-named means after said sudden movement takes place.

8. In a fish-catcher, a support, a pair of clamping-jaws to engage a line, means including a trip device for giving said jaws a sudden movement when the line is pulled, and means for opening said jaws after said sudden movement takes place.

9. In a fish-catcher, a support, a pair of clamping-jaws to engage a line, means including a trip device for giving said jaws a sudden movement when the line is pulled, a lever to open said jaws, and means for operating said lever after said sudden movement takes place.

10. In a fish-catcher, a support, a pivoted arm thereon, a pair of clamping-jaws on said arm to engage a line, means including a trip device for giving said arm a sudden movement when the line is pulled, a lever to open said jaws, and means for operating said lever after said sudden movement takes place.

In testimony whereof I affix my signature in presence of two witnesses.

HENRY C. REICHARDT.

Witnesses:
H. S. DAVID,
F. P. ROSENGARTEN.